United States Patent [19]
Lucid et al.

[11] Patent Number: 5,305,513
[45] Date of Patent: Apr. 26, 1994

[54] VEHICLE BATTERY DECKING DEVICE

[75] Inventors: Joseph A. Lucid, Farmington Hills; Robert K. Brown, Plymouth, both of Mich.

[73] Assignee: Ford Motor Company, Dearborn, Mich.

[21] Appl. No.: 949,956

[22] Filed: Sep. 24, 1992

[51] Int. Cl.⁵ .............................................. B60K 1/04
[52] U.S. Cl. ...................... 29/402.08; 29/426.3; 104/34; 180/68.5; 414/458; 414/540
[58] Field of Search ........... 104/34; 244/137.1, 118.1; 414/458, 540; 187/9 R, 8.59, 17; 180/68.5; 29/402.08, 426.3, 525.1

[56] References Cited

U.S. PATENT DOCUMENTS

| | | | |
|---|---|---|---|
| 647,475 | 4/1900 | Condict | 180/68.5 |
| 1,602,521 | 10/1926 | Britt | 180/68.5 X |
| 1,994,451 | 3/1935 | Christenson . | |
| 3,501,039 | 3/1970 | Mitsuyasu | 414/458 |
| 3,536,161 | 10/1970 | Clarke | 187/8.59 |
| 3,834,563 | 9/1974 | Teti . | |
| 4,258,816 | 3/1981 | Klink | 180/68.5 |
| 4,334,819 | 6/1982 | Hammerslag . | |
| 4,365,681 | 12/1982 | Singh | 180/68.5 |
| 4,511,637 | 4/1985 | Evans . | |

FOREIGN PATENT DOCUMENTS

2805134  8/1979  Fed. Rep. of Germany ..... 180/68.5

Primary Examiner—Margaret A. Focarino
Assistant Examiner—Michael Mar
Attorney, Agent, or Firm—Damian Porcari; Roger L. May

[57] ABSTRACT

A vehicle battery decking device for installing and removing vehicle batteries from a vehicle chassis using a battery tray and a plurality of hydraulic cylinders attached at a first end to the battery tray and attached at a second end to the vehicle chassis in which the battery is being installed or removed.

7 Claims, 2 Drawing Sheets

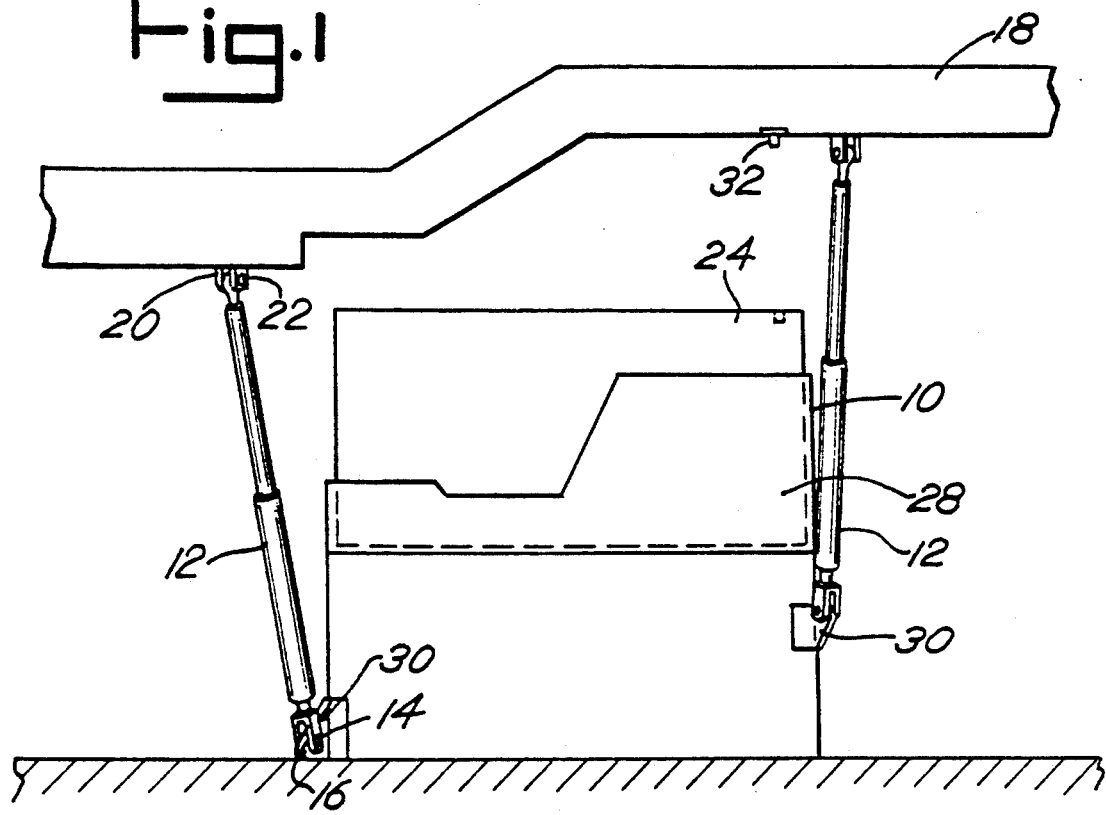
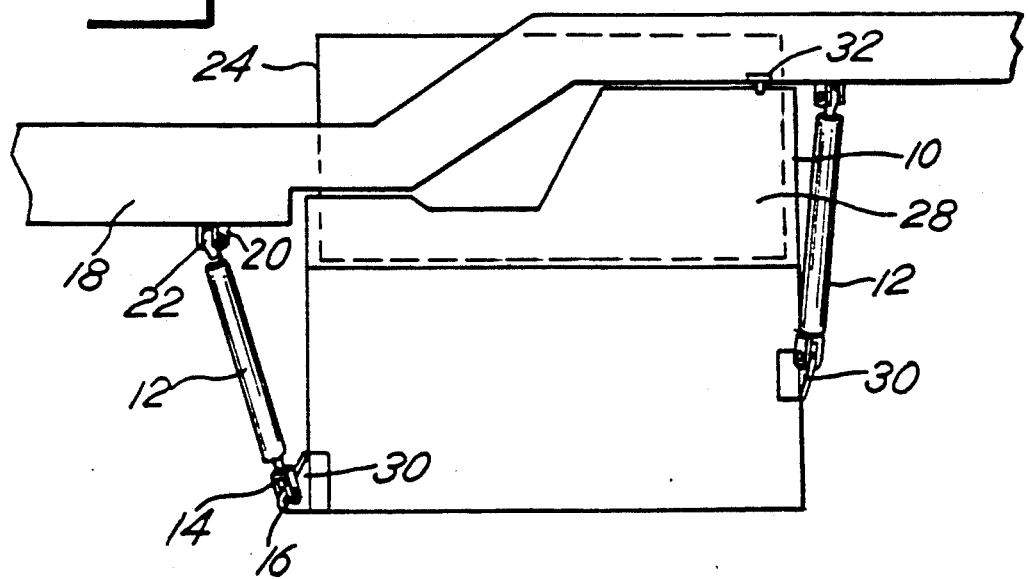

VEHICLE BATTERY DECKING DEVICE

BACKGROUND OF THE INVENTION

1. Field of the Invention

This invention relates to a material or article handling apparatus found in U.S. Class 414. This invention further relates to a load-engaging structure of an elevator or hoist type as found in sub-class 785 of U.S. Class 414. The apparatus of this invention moves a vehicle battery into or out of contact with a vehicle chassis for battery installation or removal.

2. Summary of the Related Art

U.S. Pat. No. 3,834,563 to Teti describes a battery carrier integral to a vehicle for supporting the battery and for moving the battery into and out of a battery compartment in the vehicle. The Teti apparatus includes a plurality of hydraulic pistons that, when activated pivotally, move a battery into or out of a battery compartment.

The apparatus of this invention, in certain preferred embodiments, includes a plurality of hydraulic cylinders for moving a vehicle battery. The hydraulic cylinders, however, differ greatly from the pistons of the Teti patent in their orientation and operation. The pistons of the Teti apparatus are fixed to the vehicle and pivot about a single axis to rotate the battery into and out of a battery compartment. In contrast, the hydraulic lifting devices of this invention are not fixed, they are reversibly attached to a vehicle chassis and the hydraulic cylinders lift, and do not pivot a battery into place in a vehicle chassis, using the vehicle chassis to support the weight of the battery and the weight of the apparatus.

SUMMARY OF THE INVENTION

It is an aspect of this invention to provide a vehicle battery decking device capable of moving vehicle batteries into and out of orientation with a vehicle chassis using the vehicle chassis as a lifting platform.

It is another aspect of this invention to provide a method for installing a vehicle battery into a vehicle using the vehicle battery decking device of this invention.

In one embodiment, this invention is a vehicle battery decking device reversibly supported by a vehicle chassis comprising a battery tray and a battery orientation means cooperative with the battery tray for orienting a vehicle battery with the vehicle chassis.

The orientation means is preferably a plurality of hydraulic cylinders. Each hydraulic cylinder has a first end complementary to a discrete first fixing point on the battery tray or battery tray platform. Additionally, each hydraulic cylinder has a second end complementary to a discrete second fixing point on the vehicle chassis. Generally, the apparatus will include four hydraulic cylinders that are hydraulically linked to effect uniform contact between the battery tray, or the vehicle battery and the vehicle chassis.

In another embodiment, this invention is a method for installing a vehicle battery into the chassis of a vehicle using a vehicle battery decking apparatus including a battery platform tray and a plurality of hydraulic cylinders. Each hydraulic cylinder has a first end attached to a discrete first fixing point on the battery tray, platform and a second end complementary to a second fixing point on the vehicle chassis. The battery is installed in the vehicle by first loading a vehicle battery into a vehicle battery tray to define a loaded battery tray. The loaded battery tray is placed on the battery tray platform. The first end of each of the plurality of hydraulic cylinders is attached to discrete first fixing point on the vehicle battery tray. The second end of each hydraulic cylinder is attached to a discrete second fixing point integral to the vehicle chassis and the cylinders are actuated to move the loaded vehicle battery tray towards the vehicle chassis until the vehicle battery is united with the vehicle chassis. The vehicle battery is then attached to the vehicle chassis and the hydraulic cylinders are actuated to move the battery tray platform away from the vehicle chassis.

DESCRIPTION OF THE DRAWINGS

FIG. 1 is a side view of the vehicle battery decking device of this invention with an unoriented battery.

FIG. 2 is a side view of the vehicle battery decking device of this invention with an oriented battery, ready to be fixed in the installed position.

DESCRIPTION OF THE PREFERRED EMBODIMENT

Figure 3:
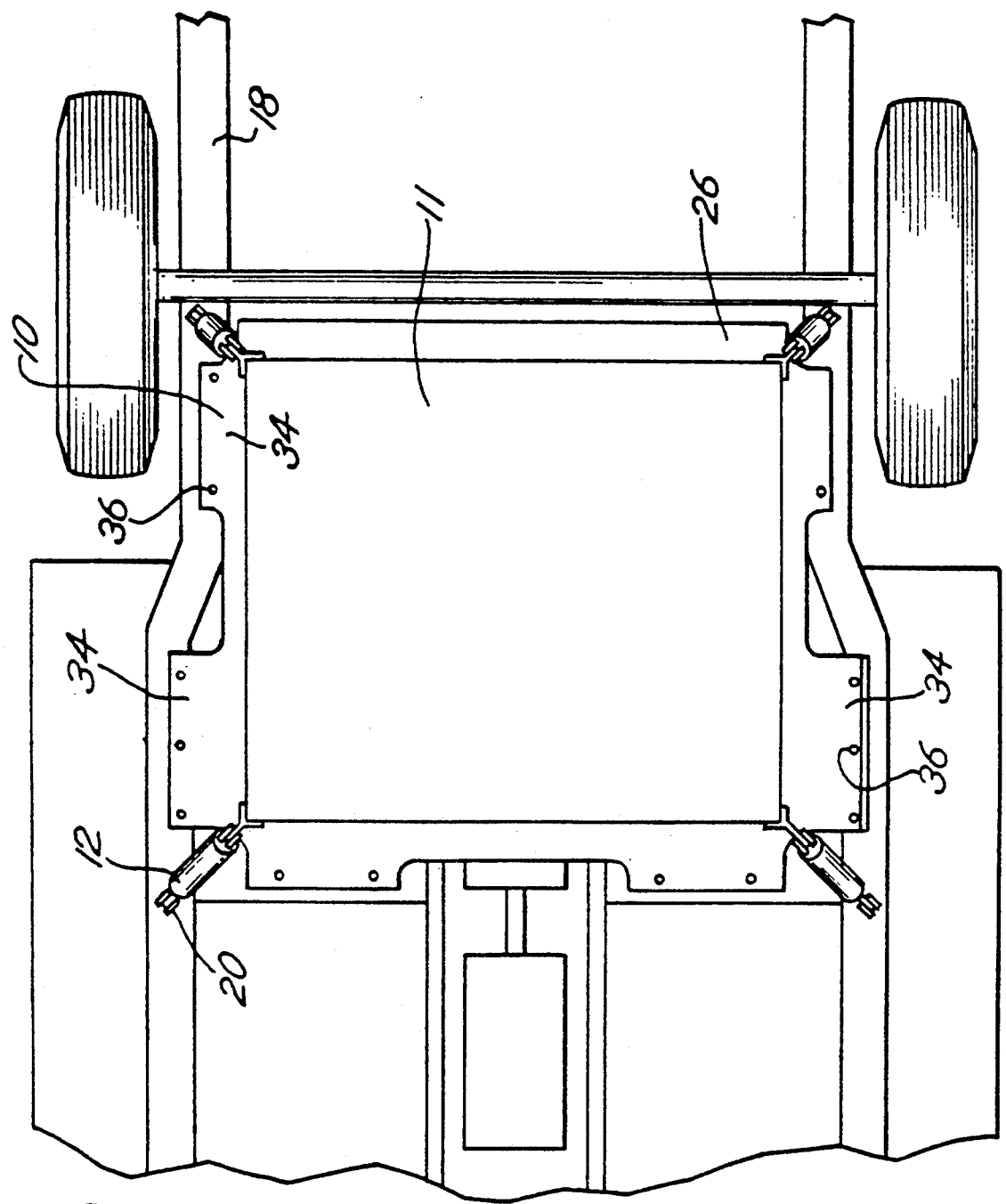
FIG. 3 is a bottom view of a vehicle battery decking device of this invention associated with a vehicle chassis.

The batteries lifted by the apparatus of this invention are extremely heavy, weighing as much as 800 lbs. or more. The apparatus of this invention is used to lift heavy batteries into place by using chassis of a vehicle as the platform from which a battery is hydraulically lifted into and out of position within the vehicle chassis. The batteries lifted by the claimed apparatus may be installed and removed from a vehicle chassis very precisely from uneven surfaces below the vehicle.

Referring now to the drawings, FIG. 1 and 2 are side views of a vehicle battery decking device of this invention, with unoriented and oriented vehicle batteries respectively. FIG. 3 is an bottom view of the vehicle battery decking device of this invention associated with a vehicle chassis.

The vehicle battery decking device of this invention comprises a battery tray 10 and a means cooperative with battery tray 10 and a vehicle chassis 18 for orienting the battery and battery tray flush with the chassis vehicle 18 using vehicle chassis 18 as a lifting platform. Any means capable of moving battery tray 10 including vehicle battery 24 into and out of orientation with a vehicle chassis can be used. A preferred means is a pneumatic or hydraulic mechanism, with hydraulic cylinders being most preferred. Preferably, the device of this invention includes plurality of hydraulic cylinders 12. Each hydraulic cylinder 12 has a first end 14 complementary to a discrete first fixing point 16 on battery tray 10 or on battery tray platform 11 and a second end 22 complementary to a discrete second fixing point 20 on vehicle chassis 18.

Each hydraulic cylinder is intended to be attached to a discrete first fixing point 16 on battery tray 10 or on battery tray platform 11 and to discrete second fixing point 20 on vehicle chassis 18. Therefore, if there are four hydraulic cylinders then there will be at least four first fixing points located on battery tray 10 or battery tray platform 11. Preferably, the plurality of hydraulic cylinders 12 are attached to first fixing points 16 that are evenly spaced around battery tray 10 or battery tray platform 11 so that battery tray 10 can be uniformly supported and moved into and out of orientation with vehicle chassis 18.

Vehicle chassis 18 includes a plurality of discrete second fixing points 20 each complementary to second end 22 of each hydraulic cylinder 12. The second fixing points are located on the vehicle chassis so that they correspond to the location of first fixing points 16 on battery tray 10 or battery tray platform 11 such that a hydraulic cylinder 12 can be attached to first fixing point 16 and second fixing point 20 to affect the movement of battery tray 10 towards or away from vehicle chassis 18 using vehicle chassis 18 as a lifting platform.

First end 14 of hydraulic cylinder 12 may be permanently fixed to battery tray 10 or battery tray platform 11 or it may be removably fixed to battery tray 10 or battery tray platform 11. The term "permanently fixed" does not mean that first end 14 of hydraulic lifting cylinder 12 cannot be removed from first fixing point 16. "Permanently fixed" merely means that first end 14 is not intended to be regularly attached to and removed from first fixing point 16. Instead, hydraulic cylinder 12 may be "permanently fixed" to a first fixing point 16 such that hydraulic cylinder 12 can be occasionally removed for replacement or repair purposes. It is preferred that first end 14 is permanently fixed to first fixing point 16.

Second end 22 of each hydraulic cylinder 12 is intended to be reversibly attached to second fixing point 20 on vehicle chassis 18. The vehicle battery decking device of this invention is intended to be used to orient vehicle battery with vehicle chassis 18 in assembly line or repair applications. Therefore, the device must be reusable, and second end 22 of hydraulic cylinder 12 is constructed so hydraulic cylinder 12 can be reversibly attached to a discrete second fixing point 20. Any reversible attaching means known in the art may be used. For example, second end 22 may include an aperture that is complementary to second fixing point 20 which is a shaft or vice versa.

Battery tray 10 is typically shaped to be complementary to the shape of the vehicle battery that is being oriented or removed from orientation with a vehicle chassis. Typically, battery tray 10 will include a floor 26 and one or more walls 28 all resting on battery tray platform 11. Floor 26 provides the support deck upon which heavy vehicle battery 24 can be placed. Walls 28 act as a template to keep vehicle battery 24 from moving during orientation with a vehicle chassis thereby facilitating battery installation.

Battery tray 10 may also rest on battery tray platform 11 to define a battery tray unit. Battery tray platform 11 elevates vehicle battery 24 thereby aiding in uniting hydraulic cylinders 12 with vehicle chassis 18. The battery tray unit may be lifted in unison with hydraulic cylinders 12 to orient vehicle battery 24 with vehicle chassis 18.

Battery tray 10 may be made of a variety of materials including plastics or metals. Due to the corrosive nature of the elements commonly found in batteries, however, it is preferred that battery tray 10 is manufactured of a plastic material that is resistant to attack by acids. It is especially preferred that battery tray 10 is a composite plastic material having a reinforced filler. Such a material is acid resistant, strong, and easily fabricated into the desired shape.

Floor 26, walls 28, or battery tray platform 11 may include support brackets 30 on where first fixing points 16 are located. Support brackets 30 reinforce the location of first fixing point 16. Support brackets 30 also prevent battery tray 10 from becoming warped or deformed as a result of orienting the very heavy vehicle battery 24 using hydraulic cylinders 12.

Battery tray 10 preferably supports vehicle battery 23 both while vehicle battery 24 is being lifted into place, and also while vehicle battery 24 is located in vehicle chassis 18. When installed in vehicle chassis 18, battery tray 10 protects the installed battery from becoming damaged or contaminated during normal vehicle operation by shielding vehicle battery 24 from road debris. Battery tray 10 preferably includes tabs 34 having holes 36 for uniting battery tray 10 with vehicle chassis 18. Bolts or some other attaching means pass through holes 36 in tabs 34 to reversibly attach battery tray 10 to vehicle chassis 18.

Vehicle chassis 18 will typically include integral or removable guides 32. Guides 32 ensure the proper, final orientation of vehicle battery 24 or battery tray 10 with vehicle chassis 18 when vehicle battery 24 is lifted into place. A guide 32 may be a male fitting or a female fitting complementary to guides located on vehicle battery 24 or battery tray 10.

The vehicle battery decking device of this invention uses a plurality of hydraulic cylinders 12 to move battery tray 10 and vehicle battery 24 into orientation with vehicle chassis 18. Each hydraulic cylinder is extended or retracted under hydraulic or pneumatic power to cause battery tray 10 to move into or out of orientation with vehicle chassis 18. It is preferred that there are four pneumatic or hydraulic cylinders. Typically, battery tray 10 will be square or rectangular in configuration and each of the four hydraulic cylinders will be located in proximity of a corner of battery tray 10.

It is also preferred that hydraulic cylinders 12 are hydraulically united. By hydraulically united it is meant that the hydraulic cylinders will each have a common and linked hydraulic or pneumatic power source and the hydraulic or pneumatic power will be distributed as needed to each hydraulic cylinder 12 in order to orient vehicle battery 24 flush with chassis 18. The linked hydraulic cylinder system allows the battery tray 10 or vehicle battery 24 to uniformly contact vehicle chassis 18. For example, as a vehicle battery 24 is being lifted into place in vehicle chassis 18, the battery tray 10 or vehicle battery 24 is unlikely to contact vehicle chassis 18 uniformly due to the shape of the battery, the shape of chassis 18 or due to the uneven lifting or orientation surfaces. Instead, one point on battery tray 10 or vehicle battery 24 typically will contact vehicle chassis 18 first. Hydraulically uniting each hydraulic cylinder 12 allows the device to maintain but not increase pressure to the hydraulic cylinder in the proximity of the initial contact point while increasing the hydraulic pressure to the remaining hydraulic cylinders which continue to urge battery tray 10 into a flush orientation with vehicle chassis 18.

The plurality of hydraulic cylinders 12 can all have equal ranges of motion, they can have a combination of equal and unequal ranges of motion or they may each have different ranges of motion. Selection of the range of motion of each hydraulic cylinder 12 will depend upon various factors including the initial and the final orientation of vehicle battery 24 within vehicle chassis 18.

The vehicle battery decking device of this invention can be used to install vehicle battery 24 into a flush orientation with vehicle chassis 18 or to remove vehicle battery 24 from a flush orientation with vehicle chassis 18. To install a vehicle battery into a vehicle chassis 18, vehicle battery 24 is loaded onto battery tray 10 prior to or after it is located upon battery tray platform 11. The loaded battery tray is moved into a position below the chassis of a vehicle. Next, hydraulic cylinders 12 may be attached at first end 14 to discrete first fixing points 16 located on battery tray 10 or battery tray platform 11. Alternatively, hydraulic cylinders 12 may be permanently fixed to a first fixing point making this attaching step unnecessary. Vehicle battery 24 is now ready to be oriented flush with vehicle chassis 18.

Vehicle battery 24 can be oriented with a vehicle chassis 18 by two different methods. If the distance between vehicle battery 24 and vehicle chassis 18 is less than the maximum range of motion of hydraulic cylinders 12 then the hydraulic cylinders can be exclusively used to lift battery tray 10 into contact with vehicle chassis 18. This is accomplished by attaching the second end 22 of each hydraulic cylinder 12 to a discrete second fixing point 20 on vehicle chassis 18. If the distance between vehicle chassis 18 and loaded battery tray 10 is greater than the maximum extended length of the hydraulic cylinders, then a scissor lift or some other means known in the art for lifting heavy objects can be used to move the entire vehicle battery decking device close enough to vehicle chassis 18 so that the plurality of hydraulic cylinders 12 can each be attached to a second fixing point 20.

The hydraulic cylinders 12 are actuated and the loaded battery tray is moved toward vehicle chassis 18. The movement of battery tray 10 is halted when vehicle battery 28 is oriented flush with chassis 18. This occurs when battery tray 10 or vehicle battery 24 is in intimate contact with substantially the entire mating flange 25 on vehicle chassis 18. At this point, vehicle battery 24 should be united with guides 32 associated with vehicle chassis 18. Vehicle battery 24 is then attached to vehicle chassis 18 using any appropriate attaching means known in the art and hydraulic cylinders 12 are simultaneously actuated to move empty battery tray 10 away from vehicle battery 24 and vehicle chassis 18. Finally, second end 22 of each hydraulic cylinder 12 is detached from second fixing points 20 on vehicle chassis 18, and the vehicle battery decking device is ready to be used again.

The vehicle battery decking device of this invention may also be used to remove a vehicle battery from a flush orientation with a vehicle chassis. The method by which a battery is removed from a vehicle chassis using a device of this invention is very similar to the method for installing a battery in a vehicle chassis. First, the vehicle battery decking device of this invention is moved underneath a vehicle chassis 18 containing vehicle battery 24. The vehicle battery decking device may be lifted towards vehicle battery 24 if the range of motion of the hydraulic cylinders 12 is insufficient to reach the second fixing points 20 located on vehicle chassis 18 when totally extended. The second end 22 of each hydraulic cylinder 12 is reversibly attached to a discrete second fixing point 20 integral to vehicle chassis 18. Battery tray 10 is next moved oriented vehicle battery 24, and vehicle battery 24 is detached from vehicle chassis 18 so that it rests in battery tray 10. Hydraulic cylinders 12 are then activated to retract and move battery tray 10 containing vehicle battery 24 away from vehicle chassis 18 Once, the plurality of hydraulic cylinder 12 are retracted, they may be detached from second fixing point 20 of vehicle chassis 18.

The above has been offered for illustrative purposes only and is not intended to limit the scope of this invention which is defined in the claims below.

What we claim is:

1. An apparatus for mounting and removing a vehicle battery in an electric powered vehicle comprising, in combination;

a vehicle battery;

a battery tray adapted to hold the vehicle battery said battery tray defining at least two walls each having an upper end, said upper ends being shaped to correspond to the shape of a vehicle chassis and further defining at least one attaching surface designed to be flush with the vehicle chassis;

means for attaching said battery tray to said vehicle chassis;

a battery tray platform wherein the battery tray rests on the battery tray platform; and a plurality of hydraulically linked hydraulic cylinders each said cylinder having a first end complementary attached to a discrete first fixing point located on the battery tray platform, and a second end removably attached to a discrete second fixing point located on the vehicle chassis;

whereby upon actuation of the hydraulic cylinders the vehicle battery can be moved into and out of position in relation to the vehicle chassis and when said battery tray is attached to said vehicle, said hydraulic cylinder and battery platform can be removed.

2. The apparatus of claim 1 including four hydraulic cylinders.

3. The apparatus of claim 1 wherein the first end of each hydraulic cylinder is permanently fixed to a discrete first fixing point.

4. A method for installing a vehicle battery into a vehicle using a vehicle battery decking apparatus including a battery tray platform and a plurality of hydraulically linked lifting cylinders, each lifting cylinder having a first end attached to a discrete first fixing point on the battery tray platform, and a second end complementary to a discrete second fixing point on a vehicle chassis comprising the steps of:

loading a vehicle battery into a vehicle battery tray to define a loaded vehicle battery tray;

placing the loaded vehicle battery tray on the battery tray platform;

moving the battery tray platform to a location below the vehicle chassis;

attaching the second end of each of the plurality of hydraulic cylinders to discrete second fixing points on the vehicle chassis;

actuating the hydraulic cylinders to move the loaded vehicle battery tray towards the vehicle chassis until the vehicle battery is united with the vehicle chassis;

attaching the vehicle battery tray to the vehicle chassis;

actuating the hydraulic cylinders to move the battery tray platform away from the vehicle chassis; and detaching the second end of each of the plurality of hydraulic cylinders from discrete second fixing points on the vehicle chassis such that the battery tray platform is no longer connected to the vehicle chassis.

5. The method of claim 4 wherein the loaded battery tray platform is moved into the vicinity of the vehicle chassis before the second end of the plurality of hydraulic cylinders are attached to the chassis.

6. The method of claim 4 wherein the first end of each hydraulic cylinder is permanently attached to a discrete first fixing point located on the battery tray platform before the battery tray is moved by the hydraulic cylinders.

7. The method of claim 4 wherein the hydraulic cylinders stop moving the loaded battery tray when he vehicle chassis contacts the vehicle battery tray.

* * * * *